United States Patent [19]
Giebel et al.

[11] Patent Number: 5,483,947
[45] Date of Patent: Jan. 16, 1996

[54] GRILL HOOD

[75] Inventors: Michael Giebel, Joplin; Steven Speck; Randy A. Love, both of Neosho, all of Mo.; Rainer B. Teufel, Columbus, Ohio

[73] Assignee: Sunbeam Corporation, Fort Lauderdale, Fla.

[21] Appl. No.: 290,145

[22] Filed: Aug. 15, 1994

[51] Int. Cl.[6] .................................................... F24C 3/00
[52] U.S. Cl. ................. 126/41 R; 126/25 R; 126/37 A; 126/41 B
[58] Field of Search ................ 126/41 R, 41 B, 126/25 R, 37 A, 220, 194

[56] References Cited

U.S. PATENT DOCUMENTS

| D. 219,629 | 12/1970 | Koziol . | |
|---|---|---|---|
| D. 226,540 | 3/1973 | Dushek . | |
| D. 231,070 | 4/1974 | Koziol . | |
| D. 252,664 | 8/1979 | Hall . | |
| D. 276,491 | 11/1984 | Shaper et al. . | |
| D. 287,214 | 12/1986 | Koziol . | |
| D. 323,952 | 2/1992 | Wagner et al. . | |
| 2,940,381 | 6/1960 | Cottongim et al. . | |
| 3,490,433 | 1/1970 | Busenbarrick . | |
| 3,605,718 | 9/1971 | Winters . | |
| 3,653,370 | 4/1972 | Shaper et al. . | |
| 3,665,913 | 5/1972 | Cagle, Jr. | 126/25 R |
| 3,938,493 | 2/1976 | Bauer | 126/41 R |
| 4,256,080 | 3/1981 | Seach . | |
| 4,989,579 | 2/1991 | Murphy et al. . | |

Primary Examiner—Larry Jones
Attorney, Agent, or Firm—Michael J. Kline

[57] ABSTRACT

An improved hood for a cooking apparatus, such as an outdoor barbecue grill. The hood includes integrally formed hinges on the sides thereof comprising a pin-in-saddle assembly. The hood also includes a stop for limiting the rearward travel of the lid with respect to the cooking surface.

22 Claims, 6 Drawing Sheets

GRILL HOOD

FIELD OF THE INVENTION

The present invention relates to cooking apparatus, such as barbecue grills, and more particularly, to outdoor barbecue grills having a hood attached with a hinge to the base of the grill.

BACKGROUND OF THE INVENTION

It is well known in the art of barbecue grills to provide a grill having a bottom body portion or fire box and an upper body portion or hood hingeably connected thereto, such as illustrated in U.S. Pat. Nos. 4,989,579; 3,653,370; 3,605,718; D276,491; and D323,952. These grills typically have hinges connecting the rear of the fire box and the rear of the hood, allowing the hood to pivot upwardly and rearwardly with respect the fire box.

It is also known to connect a hood to a grill with a top hinge, such as shown in U.S. Pat. No. D266,540.

In general, because of the location of these hinges, and the excessive weight of the cast aluminum or other metal hoods which they support, particularly in an open hood position, these hinges are subject to extreme stress and potential for metal fatigue. Additionally, because these hinges are typically exposed, they are subject to the elements and all attending corrosive forces. The hinges of the prior art also frequently require a full complement of hinge pins, screws, clips, and the like which are easily lost, are subject to corrosion, and often succumb to the severe stresses placed on the rear mounted hinge previously discussed.

U.S. Pat. No. 3,605,718 discloses a grill having an integrally formed hinge which rotatably supports the cover on the casing for rotation from a closed position to an open position. This hinge, however, is likewise attached at the rear of the grill, where it is subject to the extreme forces exerted by the opened grill hood, requiring relatively large support brackets. Additionally, this hinge is not shielded from external contaminants.

An additional disadvantage of grills having hoods hinged to the rear of the grill is the moment created about the grill itself by virtue of the cantilevered hood. This moment can cause post-mounted grills to lean rearwardly from their anchoring point, and creates a potential imbalance for portable grills and a possibility of tipping.

Accordingly, an advance in the art could be realized if an improved integrally formed hinge mechanism could be developed.

Another improvement in the art could be realized if an improved barbecue grill hood hinge could be developed that avoids the need for attachment of the hinge to the rear of the grill. Still another improvement in the state of the art could be realized if an improved grill hinge could be developed minimizing the cantilevering effect of an open hood pivotally connected to the rear of the grill.

Yet another improvement in the art could be realized if a hood hinge that is shielded from external contaminants could be developed.

SUMMARY OF THE INVENTION

It is an object of the invention to provide a hinge mechanism for a barbecue grill hood that avoids the aforementioned shortcomings of the prior art.

It is a further object of the invention to provide a hinge mechanism for a cooking apparatus that is integrally formed with the body of the apparatus.

It is still another object of the invention to provide a hinge mechanism for a cooking apparatus that is not mounted to the rear or the top of the apparatus.

It is yet another object of the invention to provide a hinge mechanism for a hood of a cooking apparatus that minimizes the cantilevering effect on the apparatus when the hood is in a fully opened position.

It is a further object of the invention to provide a device for limiting the rotation of the hinged hood, precluding excessive forces from acting on the hinged mechanism.

It is another object of the invention to provide a hinge mechanism for a cooking apparatus that is shielded from external contaminants, such as rain, snow, dust, dirt, leaves, etc. that could cause corrosion or abrasion of the hinge.

These and other objects of the invention are described in a food cooking apparatus, such as a barbecue grill having a cooking surface covered by a hood assembly comprising a lid and a base, the lid being pivotally mounted to the base, whereby the lid is capable of being opened with respect to the cooking surface, thereby exposing the cooking surface for access by a user of the food cooking apparatus. The hood assembly includes a hinge assembly positioned on the sides of the hood assembly for pivotally mounting The lid to the base.

In a preferred embodiment of the invention, the base of the hood comprises a pair of opposed base side members, each base side member having a saddle member protruding from the outside surface of the base side member with respect to the cooking surface. The lid of the hood assembly includes a pair of opposed lid side members, one lid side member being positioned outboard of each base side member. Each lid side member in turn has a pivot pin protruding from the inside surface thereof with respect to the grilling surface, the pivot pins each resting one of the saddle members of the base side member, thereby forming a hinge between each base side member and its complementary outboard lid side member. The lid side members shield the hinge from external contaminants such as those previously described.

In another highly preferred embodiment of the invention, the cooking apparatus includes a stop assembly for limiting the rearward travel of the lid with respect to the cooking surface. The stop assembly preferably comprises a first flange protruding outwardly from the outside surface of the base member, and a second flange protruding inwardly from the inside surface of the lid side member, the first and second flanges being positioned such that they contact one another as the lid is rotated to a maximum open position, thereby precluding further rotation of the lid with respect to the base.

These and other advantages and features of the preferred embodiments of the invention will become more readily apparent as the following detailed description of the preferred embodiments proceeds, particularly with reference to the attached figures.

DETAILED DESCRIPTION OF THE INVENTION

As used herein, the term "food cooking apparatus" is intended to embrace any device which may be used for cooking food, including, by way of example, but not limitation, outdoor barbecue grills, smokers, steamers, gas grills, electric grills, rotisseries, table top grills, counter top grills, fryers, and any other cooking device having a food cooking region covered by a hood assembly which may be opened and closed with respect to the food cooking region.

As used herein, the term "cooking region" is intended to embrace any portion of a food cooking apparatus adapted for cooking or preparing food, including without limitation, grilling surfaces, warming racks, smoker boxes, steamer vats, fryer vats, fire boxes, and any other region which may be used to provide a heat source and food containing apparatus proximate the heat source for heating and/or cooking the food.

As used herein, the term "external contaminants" is intended to include, without limitation, rain, dew, mist, sleet, snow, dust, dirt, salt, leaves, grass, and any other airborne matter which may potentially corrode or abrade metal surfaces.

Figure 1:
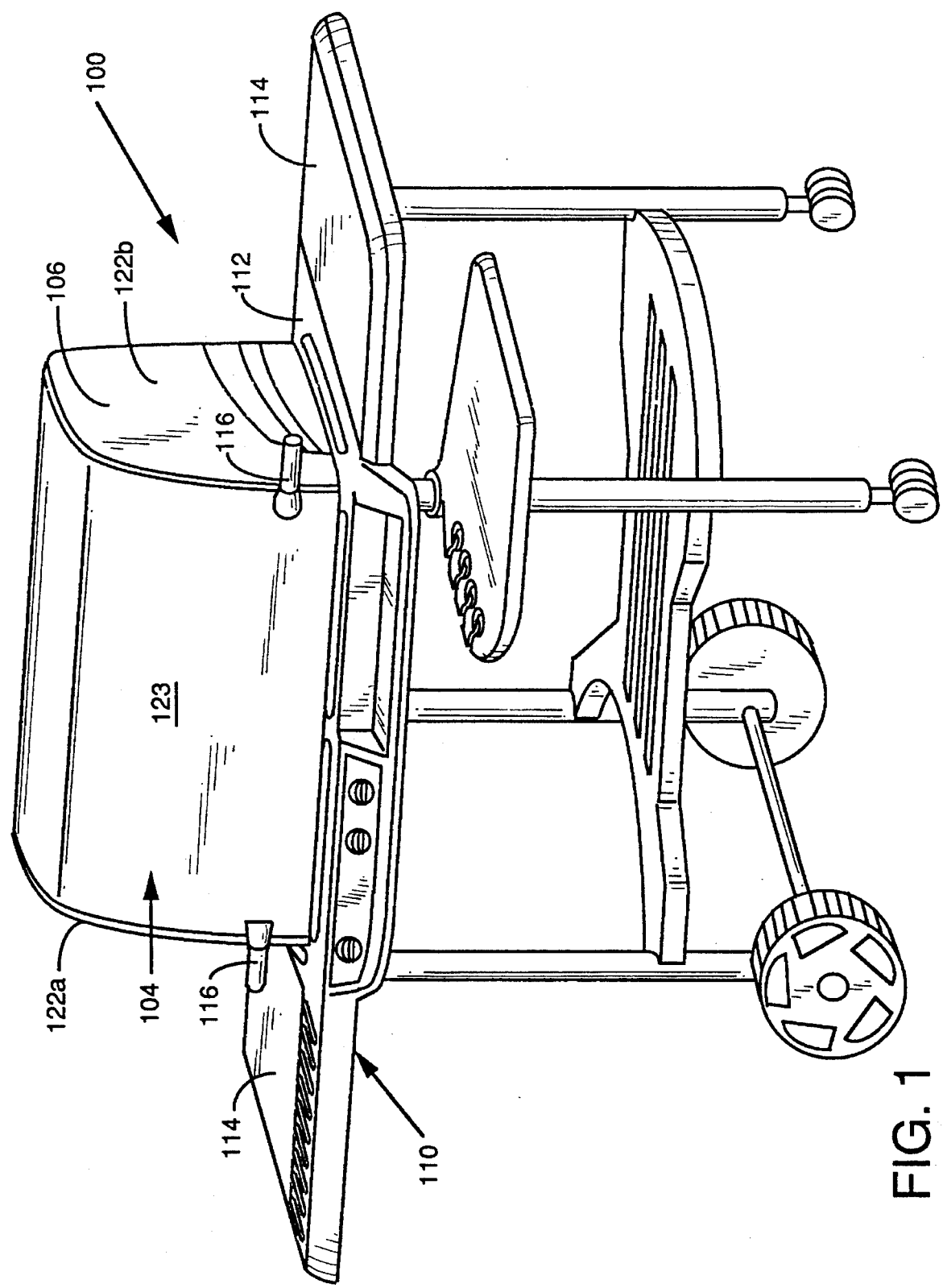
FIG. 1 is a generally perspective view of a preferred food cooking apparatus of the present invention showing the hood in a closed position.
Figure 2:
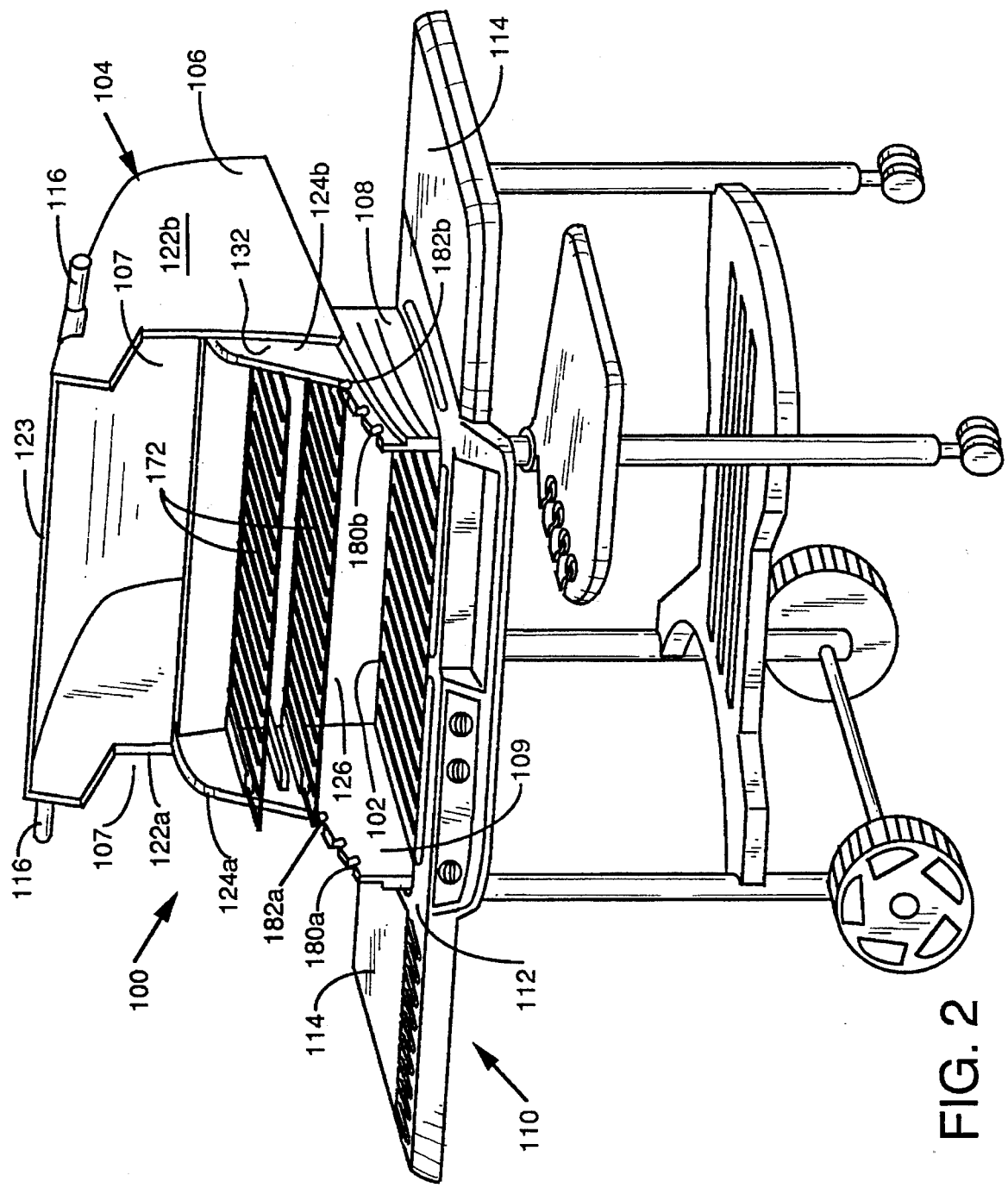
FIG. 2 is a generally perspective view of a preferred food cooking apparatus of the present invention showing the hood in a fully opened generally horizontal position.

Referring now to FIGS. 1 and 2, there is illustrated a food cooking apparatus, generally 100, which comprises an outdoor barbecue grill having a cooking region, such as a grilling surface 102 covered by a hood assembly, generally 104. The hood assembly 104, in turn, consists of a lid 106 and a base 108. The hood assembly 104 is positioned on top of a grill body, generally 110, comprising a frame 112 supporting the grilling surface 102 and one or more side tables 114. As illustrated in FIG. 2, the lid 106 is pivotally mounted to the base 108, such that the lid 106 is capable of being opened with respect to the cooking surface 102, thereby exposing the cooking surface for access by a user of the food cooking apparatus 100.

As further illustrated in FIGS. 1 and 2, the lid 106 includes one or more handles 116 for allowing the user of the food cooking apparatus 100 to lift the lid 106 into an open position as illustrated in FIG. 2 and lower the lid into a closed position as illustrated in FIG. 1.

Figure 4:
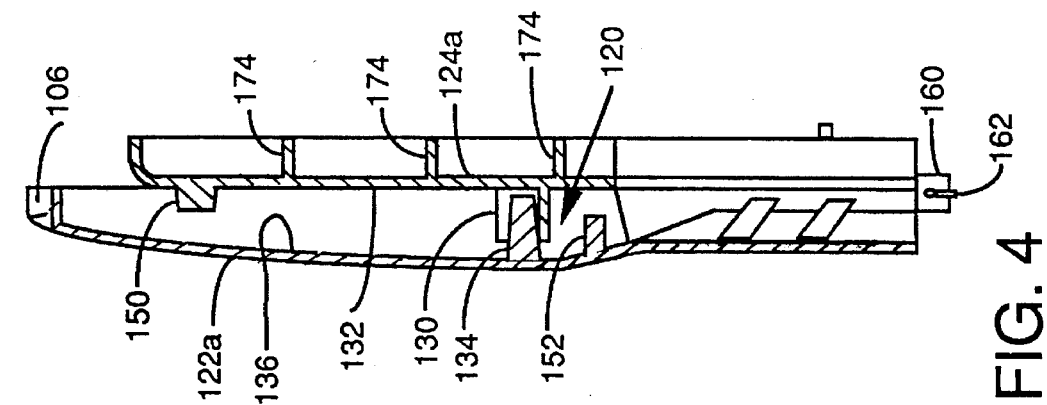
FIG. 4 is a front elevational cross-sectional view of a base side member and lid side member of the hood of the present invention, taken generally along lines 4—4 of FIG. 3.
Figure 3:
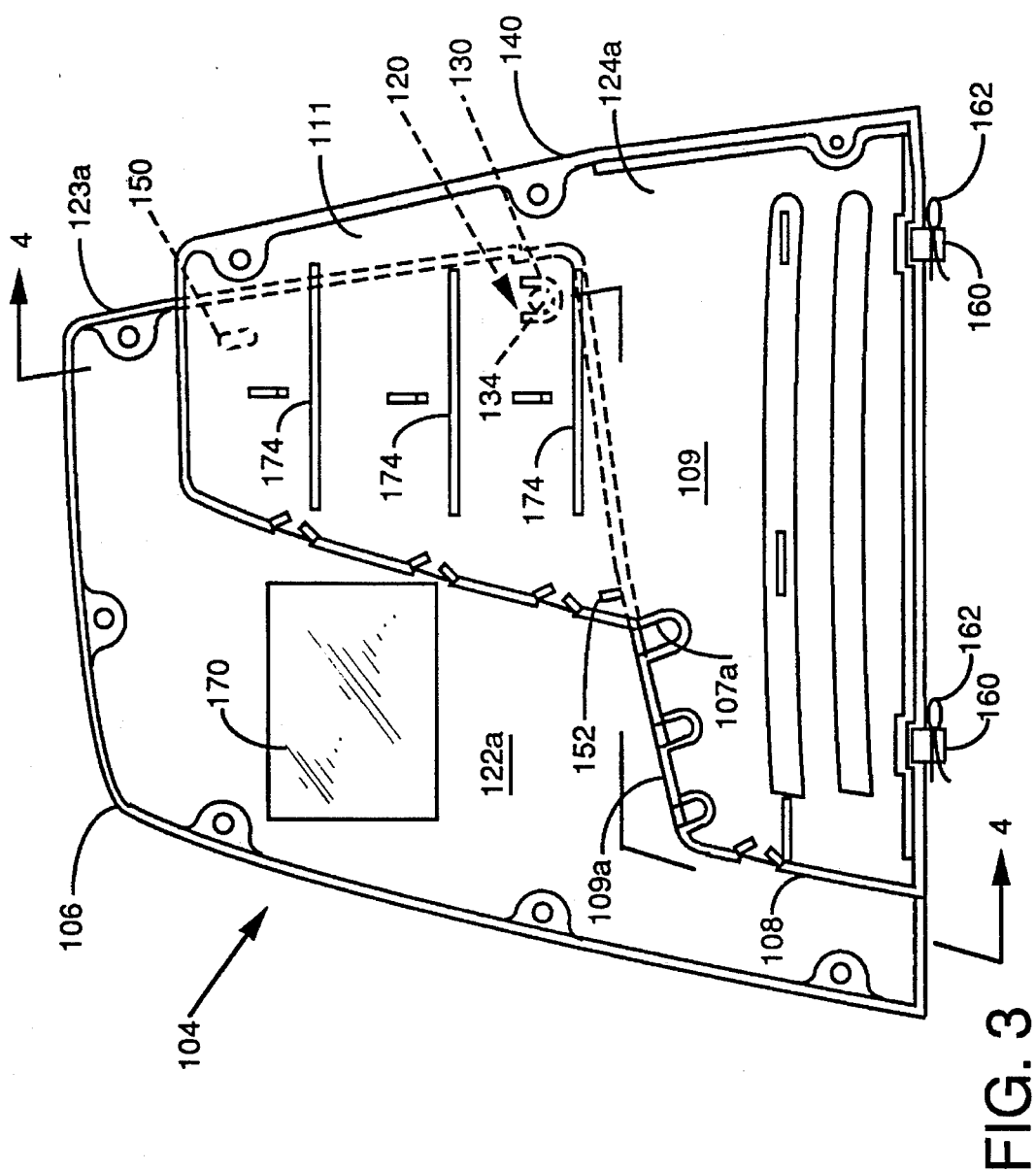
FIG. 3 is a side elevational view of a preferred hood base side member and lid side member of the present invention.
Figure 5:
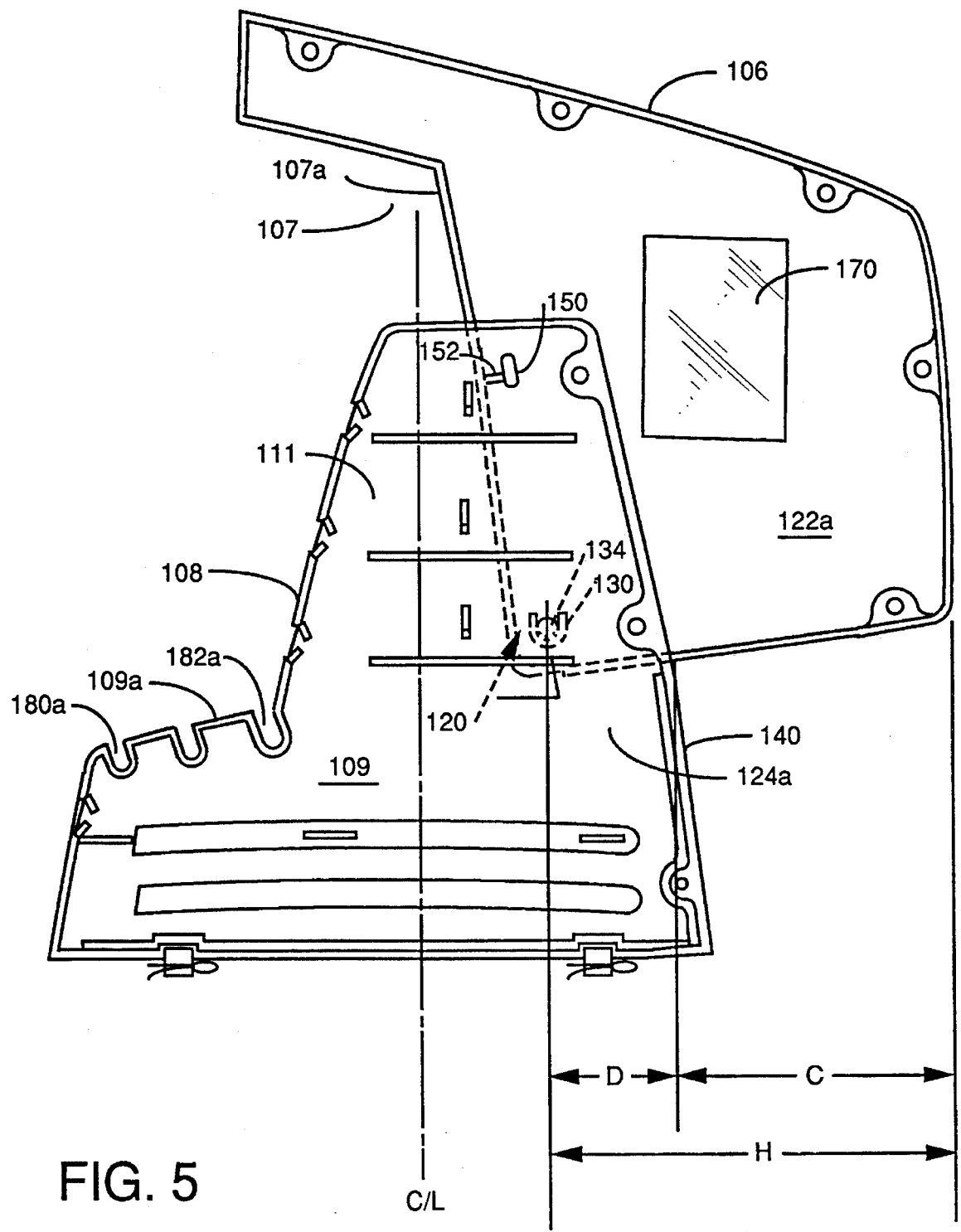
FIG. 5 is a side elevational view of a portion of a preferred hood assembly of the present invention in the opened position, showing the lid side member in a fully opened, generally horizontal, cantilevered position with respect to the base side member.

As illustrated in FIGS. 3–5, the hood assembly 104 includes a hinge assembly, generally 120, positioned on the sides of the hood assembly 104. The hinge assembly 120 is preferably positioned on each of the two sides of a left lid side member 122a and a right lid side member 122b of the lid 106 of the hood assembly 104, and allows the lid 106 to be pivotally mounted to the base 108. The lid side members 122a and 122b are connected by a lid front and top portion 123 as best seen in FIG. 1.

In a highly preferred embodiment of the invention, illustrated in FIGS. 3, 4 and 5, the hinge assembly 120 pivotally connects the lid side members, 122a, 122b, to a pair of opposed hood base side members, a left base side member 124a and a right base side member 124b, respectively. The base side members 124a and 124b preferably comprise the sides of the hood base 108, which may also have a rear wall portion 126 joining the two side members 124a, 124b as illustrated in FIG. 2.

FIGS. 3 and 4 generally show the left side of the hinge assembly, generally 120, of the present invention, but it should be understood that a complementary right side hinge assembly associated with the right lid side member 122b and right base side member 124b is also preferably employed in the preferred embodiment of the invention. Therefore, unless otherwise stated to the contrary herein, the following discussion with respect to the hinge assembly 120 of the left lid side member 122a and left base side member 124a applies with equal force to the hinge assembly 120 of the right lid side member 122b and right base side member 124b.

Each base side member, 124a, 124b, preferably includes a saddle 130 protruding from the outside surface 132 of the base side member 124a, 124b, with respect to the cooking region 102. As further illustrated in FIG. 2, the lid side members 122a and 122b are each preferably positioned on the outboard side of the base side members 124a, 124b, respectively, with respect to the cooking region 102. It would, of course, be possible to position the lid side members 122a, 122b on the inboard side of the base side members 124a, 124b, respectively, with respect to the cooking region 102, but this would create a disadvantage in the form of possible escape of heat, smoke, flame, etc. from the cooking region or fire box of the food cooking apparatus 100.

Each of the opposed lid side members 122a, 122b, preferably includes a pivot pin 134 protruding from the inside surface 136 of each lid side member 122a, 122b. As best seen in FIGS. 3 and 4, the pin 134 rests in the saddle 130 of the base side members 124a, 124b, thereby forming a hinge between each of the base side members 124a, 124b and its complementary outboard lid side member 122a, 122b, respectively. As shown in FIG. 4, the hinge assembly 120 is shielded from the environment by virtue of the lid side members 122a, 122b, which include a curved portion 125 around their perimeter for fastening the lid side members 122a, 122b to the lid front/top portion 123, for example, by welding, or with fasteners, such as screws, bolts, etc.

As illustrated in the FIGS. 3 and 5, the hinge assembly, generally 120, is preferably located proximate the rear of the lid 106, but positioned forwardly of the rear 140 of the base side member 108. Positioning the hinge assembly 120 in this fashion allows the lid 106 to have a reduced cantilevered portion relative to the rear-connected hinges of the prior art. As illustrated in FIG. 5, when the lid 106 is in the fully opened position, such that it is substantially horizontal, the lid has a cantilevered portion which extends rearwardly of the rear 140 of the base 108 by a distance "C," which distance is less than the height "H" of the lid as measured from the pivot point 120 to the top of the lid 106. This distance, generally "D", generally corresponds to the distance by which the saddle 130 is positioned forwardly of the rear surface 140 of the base 108.

Additionally, the weight of the lid 106 may be reduced by virtue of the unique lid side members 122a, 122b, and base side members 124a, 124b. As illustrated in FIGS. 2 and 5, the lid side members 122a, 122b, include a cutout portion 107, which reduces the weight of the lid 106 by an amount corresponding to the weight of metal eliminated by the cutout portion 107. This weight is, in effect, "borrowed" by the base side members 108 in the lower side region 109, which region closely corresponds to the cutout portion 107 in size and shape. Additional weight of the lid 106 is "transferred" to the base 108 by virtue of upper vertical side sections 111 proximate the rear of the base side members, which further assist in reducing the weight of the lid 106, allow the forward location of the hinge 120, and allow the hinge 120 to be raised with respect to the cooking region, improving balance of the lid 106 during opening and closing. Further weight "borrowing" is achieved by virtue of the rear wall portion 126 joining the base side members 124a, 124b, allowing the lid 106 to be virtually "backless" except for a narrow rear portion 123a illustrated in FIG. 3.

The lower side regions 109 provide an added benefit in reducing the incidence of round food items, such as hot dogs, ears of corn, or potatoes, from rolling off the surface of the cooking region 102. The lower surface 107a defining the cutout portion 107 of the lid side members 122a, 122b, preferably closely corresponds to, and overlaps, the upper surface 109a of the lower side region 109 of the base side members, 124a, 124b, as illustrated in FIG. 3.

As illustrated in FIG. 5, positioning the saddle 130 forwardly of the rear 140 of the base 108 moves the hinge, generally 120, closer to the center line "C/L" of the food cooking apparatus 100, which closely corresponds to the center of gravity of the cooking apparatus 100. This, in turn, reduces the moment caused by the hood 106 rotating to and remaining in its open position, thereby reducing the tendency of the cooking apparatus 100 to rotate rearwardly.

The lid 106 also preferably includes a stop assembly for limiting the rearward travel of the lid with respect to the cooking surface. The stop assembly preferably includes a first flange 150 protruding outwardly from the outside surface 132 of the hood base member 124a, as seen in FIG. 4. A second flange 152 protruding inwardly from the inside surface 136 of the lid side member 122a is positioned as shown in FIGS. 3–5. Most preferably, the first and second flanges, 150, 152 respectively, are positioned such that they contact one another as illustrated in FIG. 5, as the lid 106 is rotated to a maximum open position, thereby precluding further rotation of the lid 106 with respect to the base 108. The stops 150, 152 are preferably integrally formed with their respective base side members and lid side members, for example, by being cast therewith of cast aluminum or other metals and alloys known to those of ordinary skill in the art.

As illustrated in FIG. 1, the cooking apparatus of the present invention includes a body portion 112 which supports the cooking surface 102. The body portion 112 also preferably includes a fire box below the cooking surface 102 for a gas burner, charcoal grate, etc. as is known to those of ordinary skill in the art. In a highly preferred embodiment of the invention, the hood 104 is positioned with respect to the body 112 by passing one or more lugs 160, illustrated in FIGS. 3 and 4 through holes in the grill body 112. The lugs 160 may be secured within the grill body 112, for example, by cotter pins 162 or other fastening means, such as pins, screws, press fittings, or other fastening means known to those of ordinary skill in the art.

As illustrated in FIGS. 3 and 5, a preferred embodiment of the invention includes a side window 170 in at least one of the lid side members 122a, 122b. Preferably, this window is of a heat resistant glass. By placing the window on the side, as opposed to the front of the grill, the amount of grease/soot collecting on the window is minimized.

As illustrated in FIG. 2, the hood 104 may include one or more warming racks 172 which are spaced above the cooking surface 102. These warming racks 172 are preferably slideably received within complimentary flanges 174 in the hood base side members 124a, 124b as seen in FIGS. 3 and 4. Preferably, the flanges 174 are integral with the hood base 124a, 124b, preferably being cast therewith. In a highly preferred embodiment of the invention, the warming racks 172 may be locked with respect to the flanges 174, for example, using one or more locking devices similar to those used in conventional indoor ovens known to those of ordinary skill in the art of indoor ovens.

Referring again to FIGS. 2, 3, and 5, the hood base side members 124a, 124b include at least one pair of notches 180a, 180b for receiving skewers. The hood base side members 122a, 122b also preferably include a pair of notches 182a, 182b, respectively for receiving a rotisserie.

Referring now to FIG. 5, the lid 106 of the hood assembly 104 is assembled to the base 108 in the following manner. The hood is positioned in a generally horizontal position substantially as illustrated in FIG. 5, and the flanges 150, 152 are lined up substantially as illustrated in order to assist in guiding the pivot pins 134 to a nested position within their respective saddles 130 during assembly of the lid 106 to the base 108. Because the saddles 130 protrude outwardly as illustrated in FIG. 4, they provide clearance between the inside surface 136 of the lid side members and the outside surface 132 of the base side members, thereby minimizing scratching and abrasion between the lid and base side members during rotation of the lid 106.

Figure 2A:
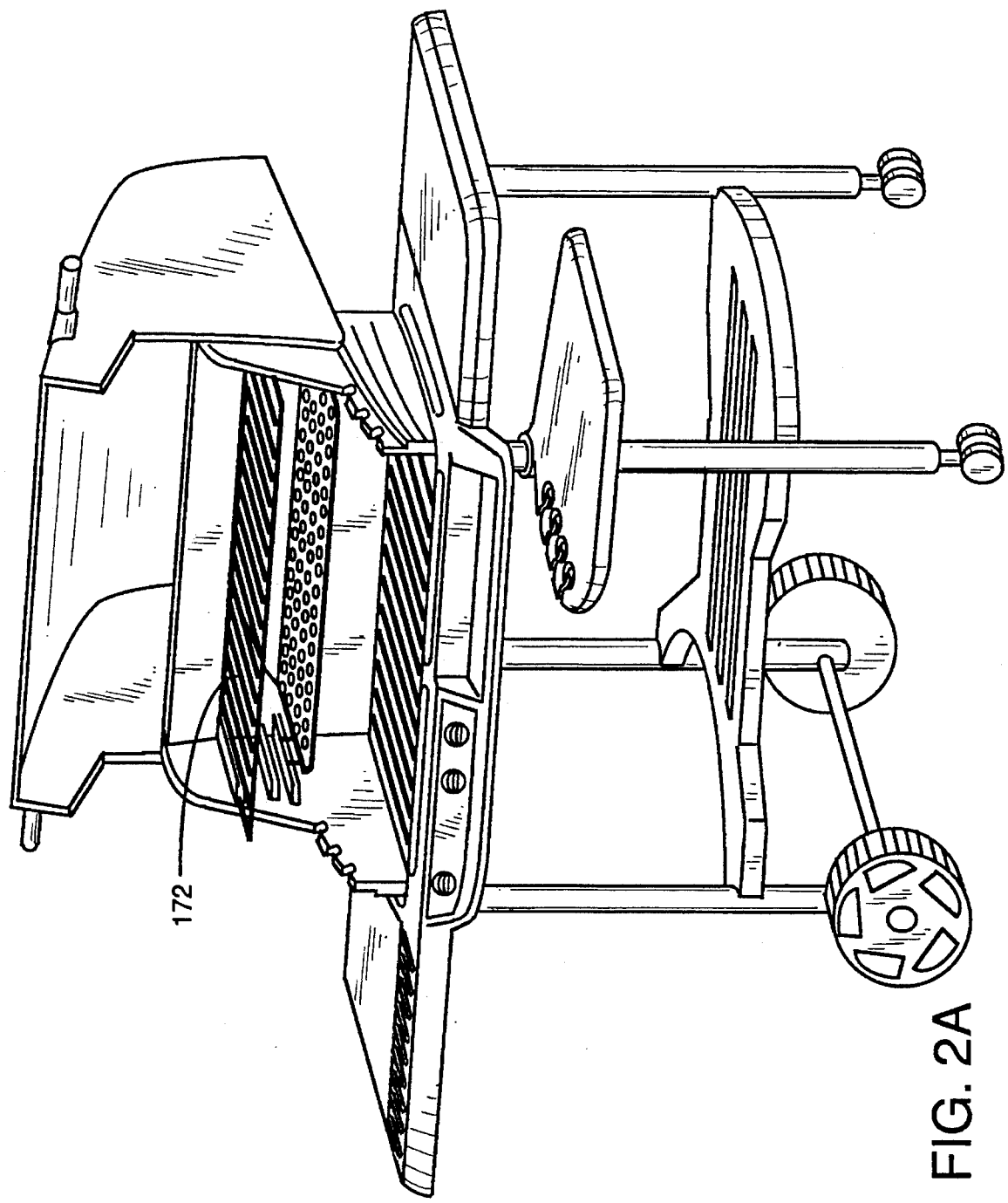
FIG. 2A is another generally perspective view of a preferred food cooking apparatus of the present invention showing an alternative grilling rack.

It would, of course, be possible to adopt known barbecue grill mechanisms in conjunction with the improved cooking apparatus of the present invention. For example, a dual warming rack, such as described in U.S. Pat. No. 4,979,437, incorporated by reference herein, assigned to the assignee of the present invention, could be advantageously used. Such a warming rack would include a pivot point connected to the base side members 124a, 124b and the lid side members 122a, 122b. Additionally, one or more of the warming racks 172 may comprise a grilling rack such as disclosed in U.S. Pat. No. Des. 323,599, incorporated by reference herein. Such an assembly is illustrated in FIG. 2A.

Figure 6:
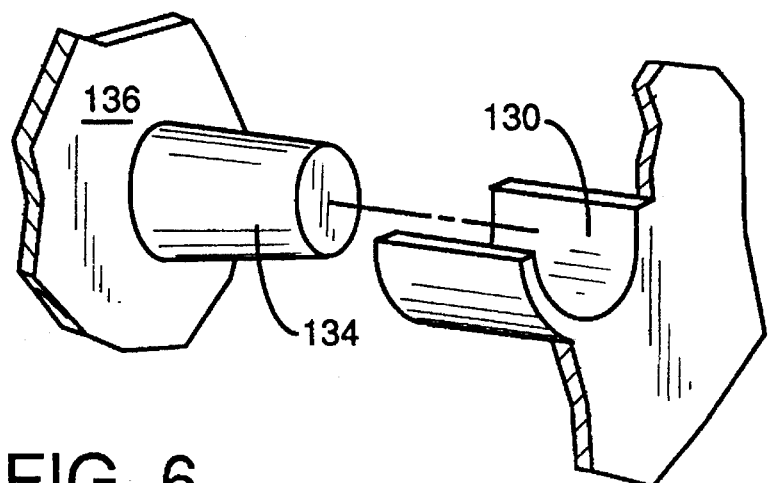
FIG. 6 is a perspective break-a-way view of a preferred hinge mechanism of the present invention.
Figure 7:
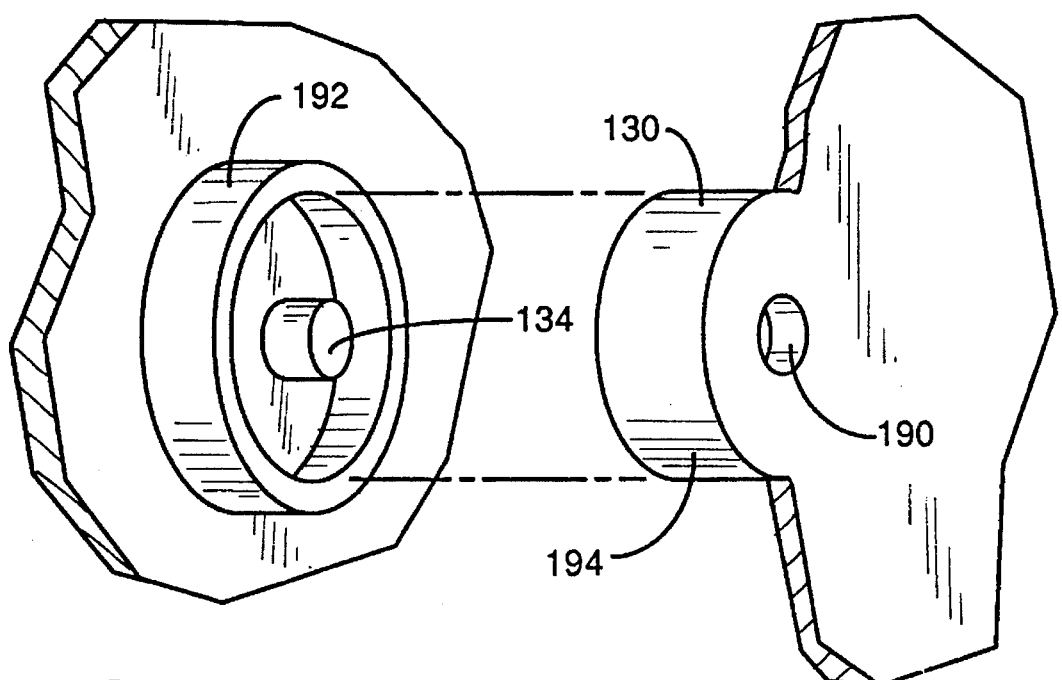
FIG. 7 is a perspective break-a-way view of another preferred hinge mechanism of the present invention.

An alternative hinge mechanism to that illustrated in FIG. 6 is illustrated in FIG. 7. In this embodiment, the saddle comprises an annular ring 130 having a hole 190 therein for receiving the pin 134. The pin 134 is surrounded by a second annular ring 192 which is sized to slip over the outside surface 194 of the first annular ring 190. In this embodiment, it is necessary to assemble the sides 122a, 122b to the hood front portion 123 after capturing the pin 134 and angular rings 192, 194.

While the specific embodiments disclosed herein have been illustrated and described, numerous modifications to those embodiments will now be readily apparent to those of ordinary skill in the art. Such modifications, while not significantly departing from the spirit and scope of the invention, are intended to be embraced within the scope of protection of the following claims, including all equivalents thereof. Additionally, the present invention has been described above in terms of representative embodiments which are illustrative, but not intended to be self-limiting. Furthermore, many objects and advantages of the invention have been set forth, however, it is understood and intended that the invention is defined by the scope of the following claims, and not by the objects and advantages.

We claim:

1. A food cooking apparatus having a cooking region covered by a hood assembly comprising a lid and a base, said lid being pivotally mounted to said base, whereby said lid is capable of being opened with respect to said cooking region, thereby exposing said cooking region for access by a user of said food cooking apparatus, said hood assembly including a hinge assembly positioned on the sides of said hood assembly for pivotally mounting said lid to said base, wherein said lid includes a stop assembly for limiting the rearward travel of said lid with respect to said cooking region said stop assembly comprising a first flange protruding outwardly from said outside surface of said base member, and a second flange protruding inwardly from said inside surface of said lid side member, said first and second flanges contacting one another as said lid is rotated to an open position, thereby precluding further rotation of said lid with respect to said base.

2. The food cooking apparatus of claim 1 wherein said cooking region is supported by a body, and said hood base includes a plurality of lugs which pass through complementary holes in said body.

3. The food cooking apparatus of claim 2 wherein said lugs are secured with respect to said body by fastening means.

4. The food cooking apparatus of claim 3 wherein said fastening means comprise press fit means on said lugs.

5. The food cooking apparatus of claim 3 wherein said fastening means comprise cotter pins.

6. The food cooking apparatus of claim 1 wherein said hood base includes at least one warming rack, said warming rack being spaced above said cooking surface and slideably received within complementary flanges in said hood base.

7. The food cooking apparatus of claim 6 wherein said hood base is cast and said complementary flanges are integrally cast with said hood base.

8. The food cooking apparatus of claim 6 wherein said apparatus includes means for locking said slideably received warming rack within said complementary flanges.

9. The food cooking apparatus of claim 1 wherein said hood base includes at least one pair of notches for receiving skewers.

10. The food cooking apparatus of claim 1 wherein said hood base includes at least one pair of notches for receiving a rotisserie.

11. The food cooking apparatus of claim 1, wherein said lid has a cantilevered portion extending rearwardly of the rear of said base by a distance less than the height of said lid when said lid is in a fully opened, horizontal position.

12. A food cooking apparatus having a cooking region covered by a hood assembly comprising a lid and a base, said lid being pivotally mounted to said base, whereby said lid is capable of being opened with respect to said cooking region, thereby exposing said cooking region for access by a user of said food cooking apparatus, said hood assembly including a hinge assembly positioned on the sides of said hood assembly for pivotally mounting said lid to said base, wherein said hood assembly comprises a pair of opposed base side members, each base side member having a saddle protruding from the outside surface of said base side member with respect to said cooking region, said hood assembly further comprising a pair of opposed lid side members, one said lid side member being positioned outboard of each base side member, each lid side member having a pivot pin protruding from the inside surface thereof with respect to said cooking region, said pivot pins each resting in one of said saddles of said base side member, thereby forming a hinge between each base side member and its complimentary outboard lid side member.

13. The food cooking apparatus of claim 12 wherein said hinge assembly is located proximate the rear of said lid, but positioned forwardly of the rear of said base side member, and said lid is opened by pivoting the lid upwardly and rearwardly with respect to said cooking region.

14. The food cooking apparatus of claim 12 wherein at least one of said lid side members includes a window therein.

15. The food cooking apparatus of claim 4 wherein said stop assembly assists in orienting said lid and guiding said pivot pins into a nested position within said saddles during assembly of said lid to said hood base.

16. The food cooking apparatus of claim 12, wherein said saddles on said base provide clearance between said inside surface of said lid side member and said outside surface of said base side member, thereby minimizing scratching and abrasion between said lid and base side members during rotation of said lid.

17. The food cooking apparatus of claim 12, wherein each saddle is integrally cast with its base side member, and wherein each pin is integrally cast with its lid side member.

18. The food cooking apparatus of claim 12, wherein said hinge assembly includes means for shielding said hinge assembly from external contaminants.

19. The food cooking apparatus of claim 12, wherein said apparatus further includes at least one warming rack pivotally mounted to said base side members and said lid side members.

20. The food cooking apparatus of claim 12, wherein said lid side members have a cutout portion, and said base side members have a side region generally corresponding in size and shape to said cutout portion.

21. The food cooking apparatus of claim 20, wherein said base side members include a vertical side portion proximate the rear of said base side members.

22. The food cooking apparatus of claim 12 including a rear wall portion joining the base side members.

* * * * *